Sept. 29, 1931. S. E. MEYERS 1,825,155
CONSISTENCY CONTROLLING DEVICE
Filed May 7, 1929 5 Sheets-Sheet 1

Inventor
Sidney E. Meyers
By Attorney
Warfield & Watson

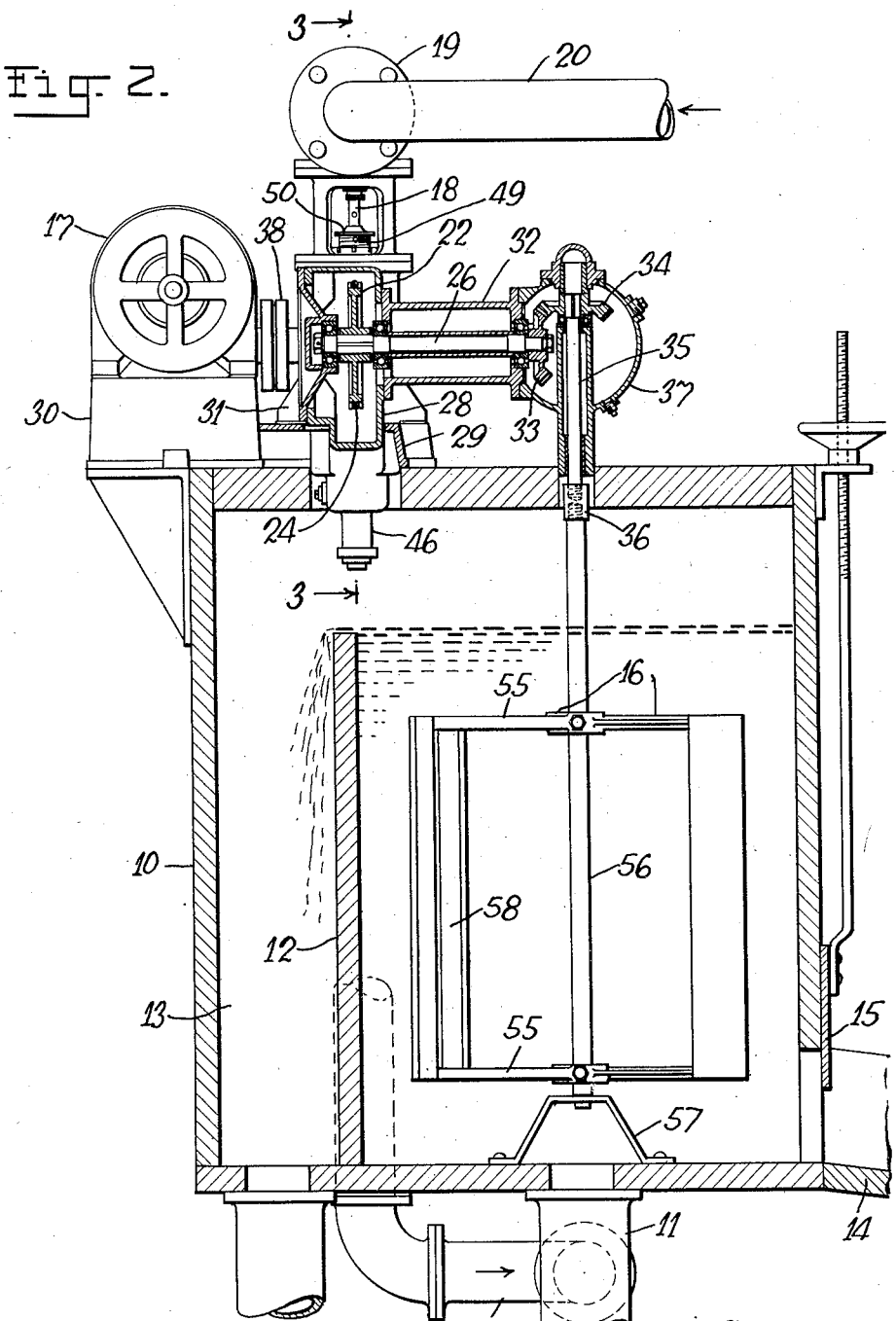

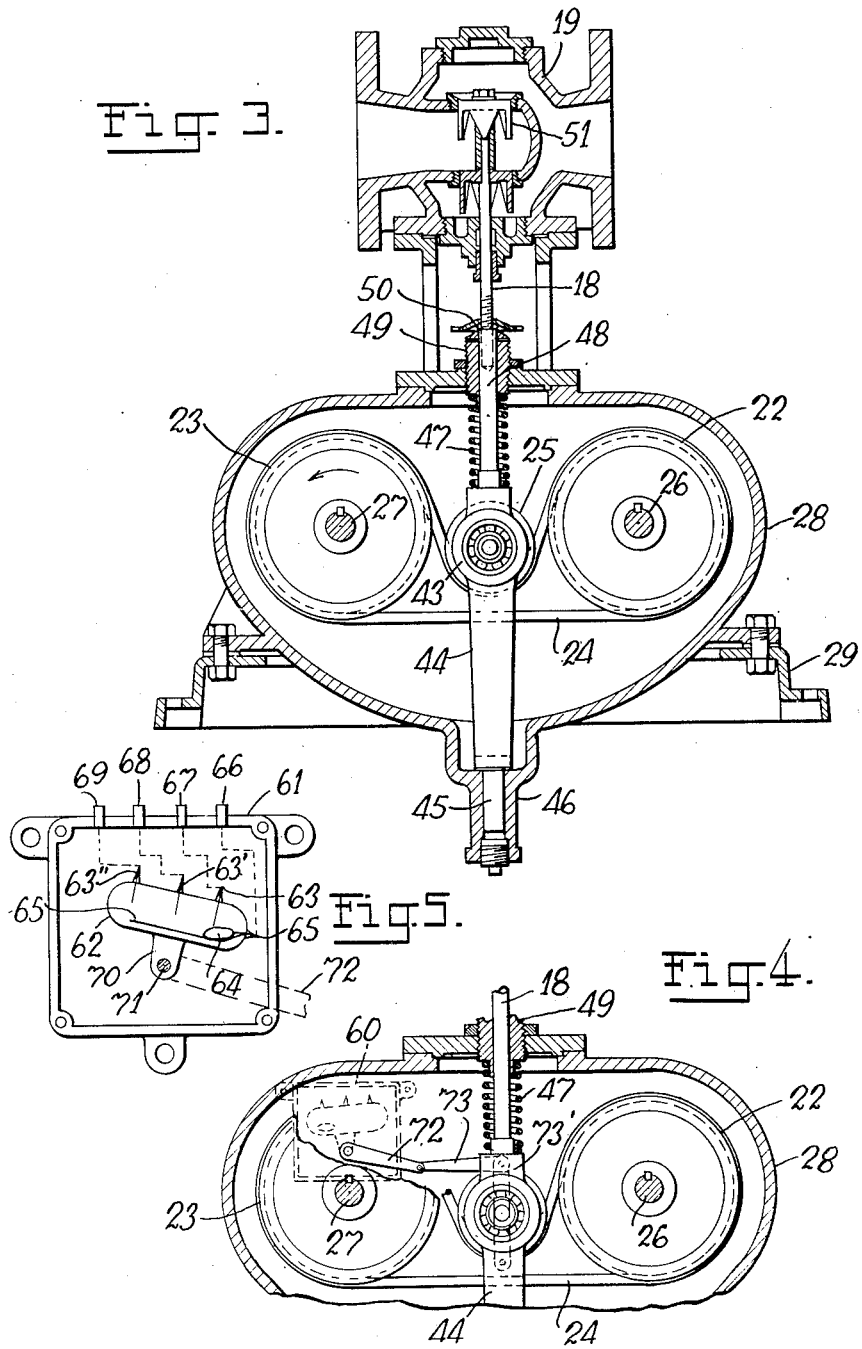

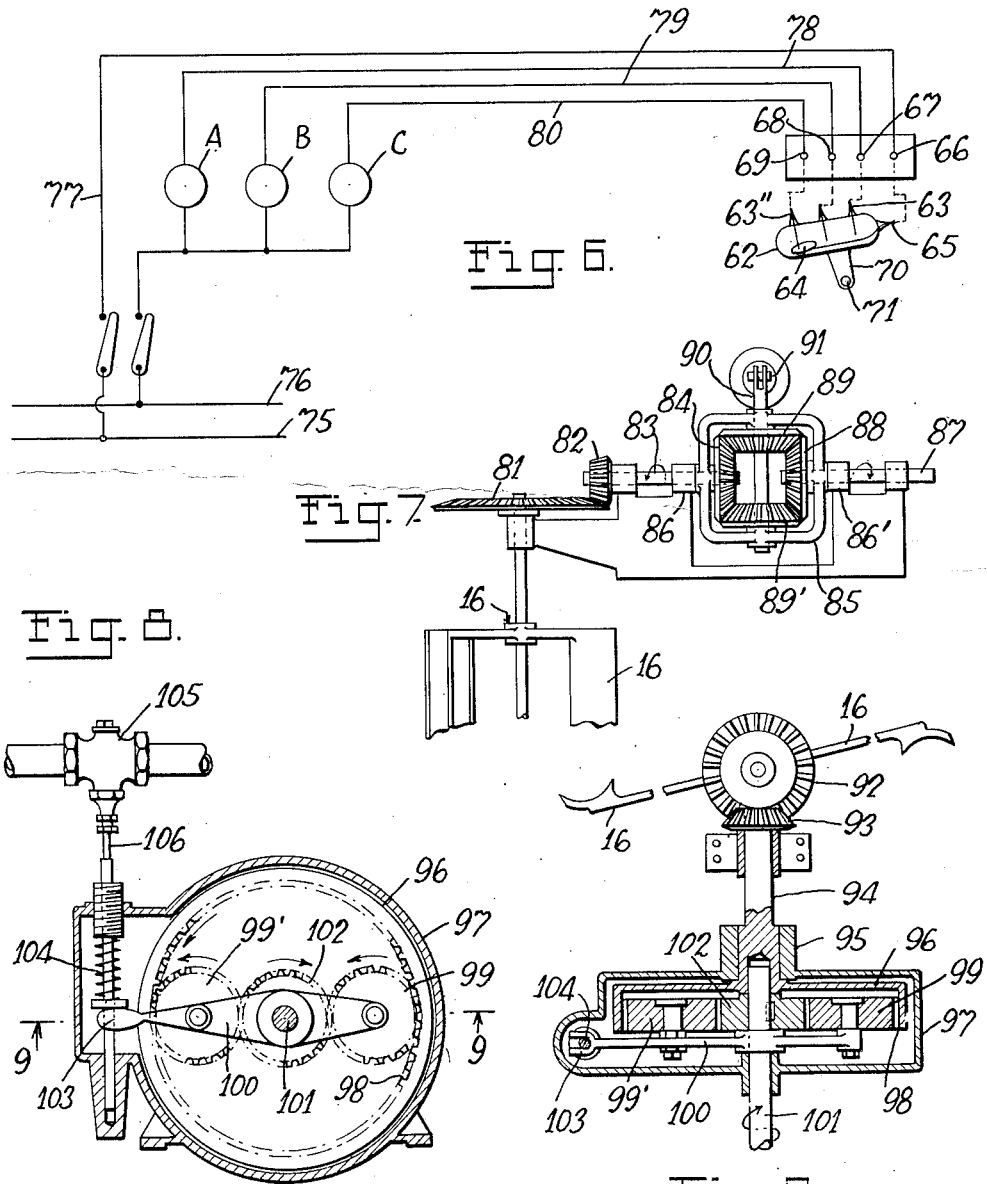

Sept. 29, 1931.  S. E. MEYERS  1,825,155
CONSISTENCY CONTROLLING DEVICE
Filed May 7, 1929  5 Sheets-Sheet 5

Inventor
Sidney E. Meyers
By Attorney
Warfield & Watson

Patented Sept. 29, 1931

1,825,155

UNITED STATES PATENT OFFICE

SIDNEY E. MEYERS, OF LOCKPORT, NEW YORK, ASSIGNOR OF ONE-HALF TO ERICSSON H. MERRITT, OF LOCKPORT, NEW YORK

CONSISTENCY CONTROLLING DEVICE

Application filed May 7, 1929. Serial No. 361,061.

This invention relates to devices for controlling the consistency of fluid suspensions and more particularly to the control of water suspensions of fibrous materials, for example, wood pulp stock used in the manufacture of paper.

The invention has for its object generally the provision of an improved construction and arrangement of parts which is efficient, economical and readily manufactured.

More specifically an object of the invention is to provide a device which responds substantially instantaneously to changes in fluid consistency and is directly proportional to such changes over a relatively wide range of variations.

It is a further object of the invention to provide means directly responsive to the viscosity of the fluid suspensions of solid material, and to this end has a part adapted to move in the fluid suspension with a frictional drag which is proportional to the viscosity of the suspension.

It is also an object to provide a fluid controlling device which regulates the supply of a fluid for modifying the consistency of the suspension so that the movement of the regulating part is proportional to the viscosity which is determined by a force differential derived from the viscosity.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which;

Fig. 2 is another view partly in section and partly in elevation similar to, but at right angles to the plane of Fig. 1 illustrating further details of a regulating device of the present invention;

Fig. 3 is a sectional view taken on the line 3—3 in Fig. 2 illustrating the details of the valve regulating mechanism which controls the flow of consistency modifying fluid in accordance with the invention;

Fig. 4 is a fragmentary sectional view showing a modified form of the valve regulating device shown in Fig. 3 which is arranged to actuate a visual indicator of the electric variety;

Fig. 5 is an enlarged view showing details of the electric actuating device employed in Fig. 4;

Fig. 6 is a view showing symbolically the arrangement of electric circuits employed in conjunction with the device in Fig. 5 for giving visual indications;

Fig. 7 is a fragmentary view showing a modified form of valve actuating device which utilizes a torque differential as the actuating principle;

Fig. 8 is a sectional view showing still another modified form for actuating the fluid valve which employs planetary gears to give a torque differential;

Fig. 9 is a sectional view taken on the line 9—9 in Fig. 8;

Figure 1:
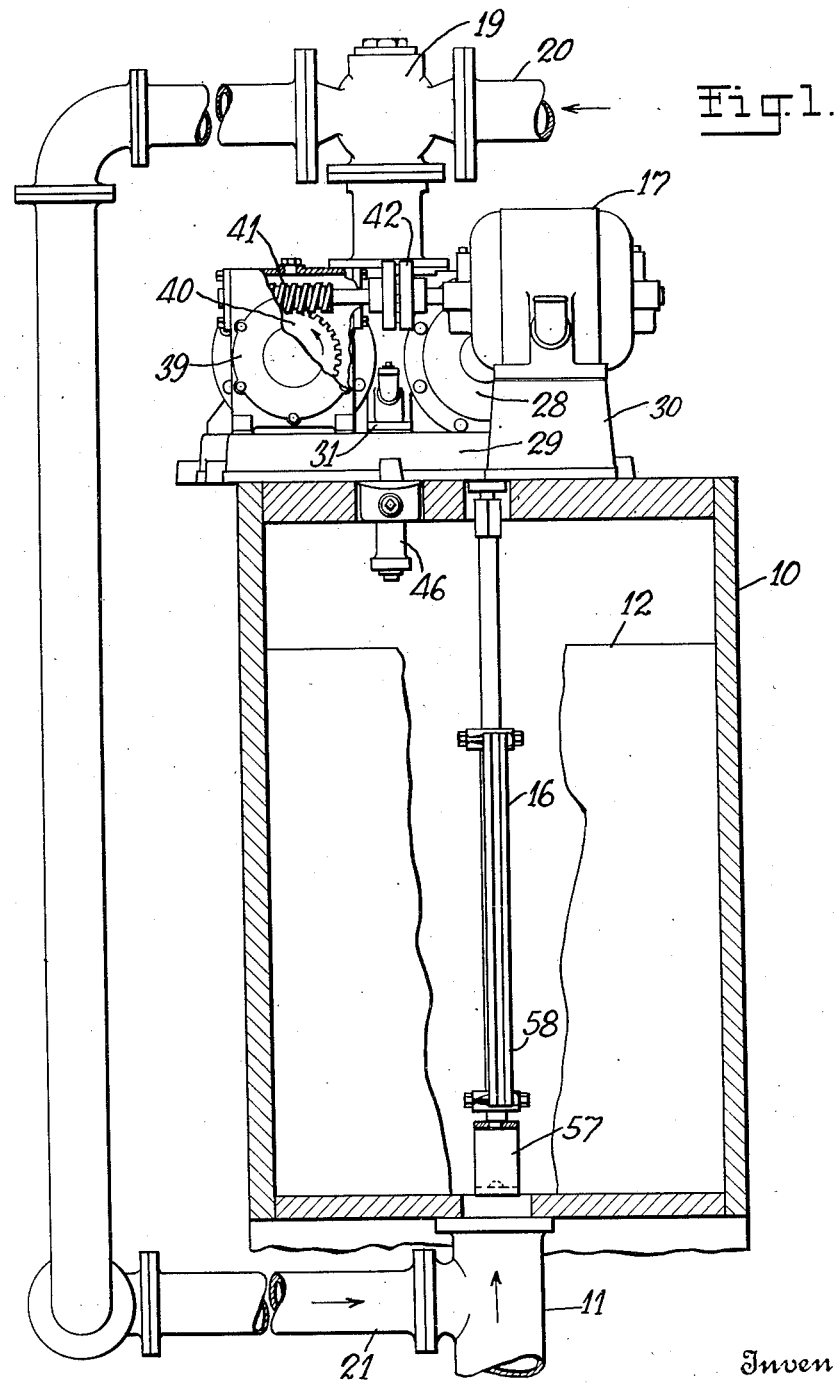
Fig. 1 is a view partly in elevation and partly in section showing a consistency regulating device constructed in accordance with the invention.
Figure 10:
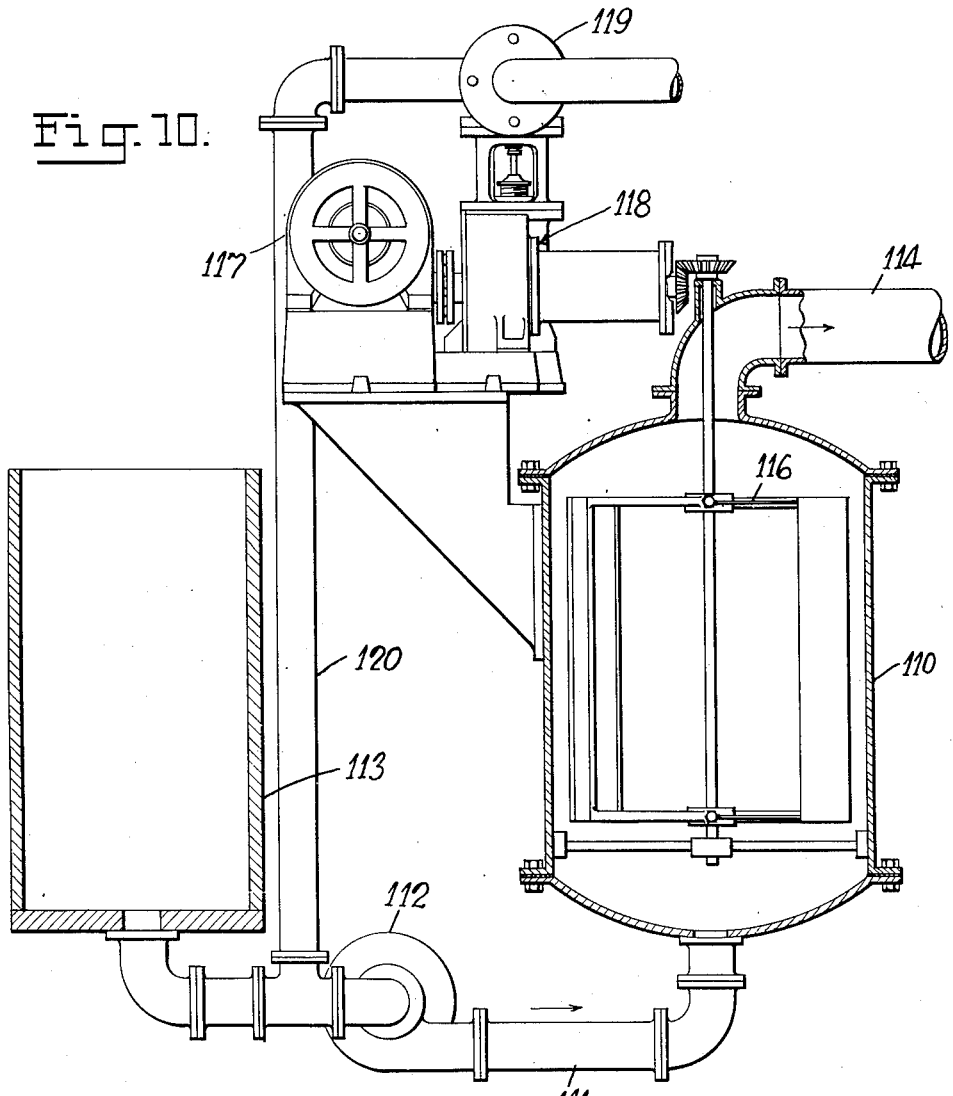
Fig. 10 is a modified form in which the regulating system shown in Fig. 1 is applied to the control of a fluid suspension which is under pressure.

Referring now to the drawings, and particularly to Figs. 1 and 2, 10 denotes a reservoir or stuff box adapted to contain a body of the fluid material containing solid particles in suspension, the consistency of which is to be regulated. The fluid suspension is supplied to the reservoir through a main conduit 11, which feeds thereinto at any convenient point, for example, at the bottom as shown. A weir or dam 12 is provided within the reservoir 10 so that a constant head of pressure is at all times provided in the reservoir, the excess of stock overflowing into the space at 13 so that the body of fluid material contained in the reservoir chamber is always in working condition. A sluice or duct 14 leads from the bottom of the reservoir, the flow of material from the reservoir to the duct being controlled by suitable means such as the hand-adjusted gate 15.

In order to determine the viscosity of the fluid suspension in accordance with its viscosity, a movable element 16 is disposed in the reservoir 10 and arranged to be continuously moved by suitable driving means, for example, an electric motor as shown at 17 between which and the element 16 there are interposed suitably driving connections arranged to give a force differential responsive to the frictional drag on the element 16. Such connections are here shown as comprising the mechanism illustrated in Fig. 3, which is adapted to move a fluid controlling means, such as the valve stem 18 of valve 19 which control the admission of a consistency modifying fluid. Such a fluid may be water and is here shown as being admitted through a conduit 20 to be admixed through the pipe connection at 21 with the fluid suspension supplied to the reservoir 10 through the main conduit 11.

In order that the force differential may represent the effort required to drive the movable element 16 and be accurately ascertained therefrom, this element is preferably provided in the form of a dasher adapted to be rotatably driven constantly from a pulley 22 coupled to be mechanically driven from a second driven pulley 23 by means of a flexible connecting member such as the cable 24. The tension in the cable 24 when the pulley 23 is driving the pulley 22 is then proportional to the driving effort and gives the force differential desired. A tension sheave, such as shown at 25, is arranged to ride on the cable 24 and will be raised thereby through a distance which is proportional to the tension in the cable. This distance may be taken as an index of the force differential. The tension sheave 25 in consequence thereof is arranged to actuate the valve 19 as hereinafter more fully explained.

A convenient mechanical arrangement for accompanying this mode of actuation is shown particularly in Fig. 3 where the pulleys 22 and 23 are keyed respectively to horizontally disposed shafts 26 and 27, journalled in the walls of the casing 28, which is arranged to enclose the pulleys and their actuating connections. This casing is supported in any convenient manner, for example on the base shown at 29, the latter being preferably extended as at 30 to provide a support for the driving motor 17. The casing is also preferably formed to provide a standard 31 on which the valve 19 may be supported.

The casing 28 as shown has a horizontal tubular extension 32 near one end arranged to enclose the shaft 26, which extends through one wall of the casing and is mechanically connected through a bevelled gear train 33—34 to drive a vertically disposed shaft 35 which is coupled to drive the rotating element 16. This coupling is preferably accomplished through a flexible or universal joint 36 so as to avoid strains in the bearings which may be transmitted from shaft 35. The bevelled gear train and the shaft 35 are also preferably encased, for example, by means of a housing as shown at 37.

The shaft 27 is also arranged to extend through a wall of the casing 28 but in a direction opposite to shaft 26, this extension being coupled for driving by the motor 17. This coupling is shown as accomplished through the flexible coupling 38 which connects the shaft 27 to a gear reduction device 39. This reduction may be accomplished in any convenient manner, for example, by a worm wheel, as shown at 40, coupled directly to the shaft 27 through a flexible coupling 38, the worm wheel being driven by a worm 41 that is coupled by means of a second flexible coupling 42 with the motor 17.

The flexible cable 24, the tension of which gives the force differential that operates the consistency regulating device in accordance with the present invention, may be of any convenient form which does not slip, for example, a chain or tubular link belt. The pulleys 22 and 23 are preferably of the grooved variety and are here shown as having a groove of a depth and character designed to cooperate with the cable to reduce slippage to a minimum, for example a roughened rectangular groove as shown. The tension sheave 25 riding on the cable 24 is preferably mounted in an anti-friction manner in a carrying bracket 43 which has a depending member 44 formed with a lower reduced end or plunger 45 adapted to work in a suitable bore or pit in a depending portion 46 of the casing 28. The bracket 44 is adapted to react against the yieldable member 47, which is interposed between the bracket and the top wall of the casing 28. This yielding member may be any suitable resilient device, for instance, a helical spring as shown. The pulley mechanism in the casing 28 is here shown as totally enclosed and consequently may run in oil if desired for lubricating purposes. The casing arrangement shown in Fig. 3 is suitable for this purpose. Where this casing arrangement is employed, the motion of the tension sheave 25 is communicated to the valve stem 18 through a suitable open device. To this end, the upper end of the carrying bracket 44 has a top plunger 48 passing through a sleeve or nut 49 and engaging exteriorly thereof with the lower end of the valve stem 18, the engagement being preferably of an adjustable character. This latter is conveniently accomplished by means of a milled coupling sleeve arranged to be in threaded engagement with the stem and plunger and provided with a lock nut all as shown at 50 whereby the adjustment is secured when once made.

From the arrangement shown it is seen that as the driving tension in the cable 24 increases, the tension sheave 25 rises and causes its carrying bracket to compress the spring 27 an amount substantially proportional to the force differential represented by the tension increase. This compression of the spring 27 is accomplished by a movement of the valve stem 18 which is seen to cause the valve member 51 in the valve 19 to open and thereby admit consistency modifying fluid to the suspension contained in the reservoir. The valve member 51 is preferably of the balanced variety so as to avoid opening or closing against fluid pressure in the conduit 20 and thereby avoid the use of compensating appliances. The valve openings in the valve member 51 are shaped so as to admit the desired amount of consistency modifying fluid for each position of the tension responsive sheave 25. The shape of these openings may be determined either experimentally or by plotting a graphical curve in accordance with a known relation between the amount of fluid present and the corresponding consistency or viscosity over the range of variations to be corrected for by the present device. A graph of this character shows that where the consistency of paper stock is to be modified by the addition of water, the cross-sectional increase in area of the fluid admitted though conduit 20 for a linear increase in the force differential is substantially proportional to the square of the linear travel of the valve. This is conveniently accomplished by forming the openings in the valve member 51 in the shape of triangles as shown.

The movable element 16 here employed is shown in the form of a rotatable dasher that is entirely submerged in the fluid suspension in the reservoir 10 and is preferably so constructed that the drag on its motion is at all times directly responsive to the viscosity of the fluid suspension. Since viscosity is a function of the frictional engagement between the particles of the suspension, the dasher is arranged to carry around with it a more or less constant amount of the solid particles in a manner which provides an engaging surface between the carried stock and the free bulk stock in the reservoir. This is readily achieved by forming the dasher with blades which are trough-shaped or concave in cross section when facing the direction of motion as illustrated in the fragmentary view shown in Fig. 11. Here 55 denotes a portion of the cross arms which are bolted or otherwise secured to the vertical shaft 56 that is rotatably mounted on the spider 57, secured to the bottom of the reservoir. The upper end of the shaft 56 is secured in the coupling 36. Between the ends of the upper and lower cross arms 55 oppositely-facing vertically disposed dasher blades 58 are disposed, these blades facing toward the direction of motion.

Figure 11:
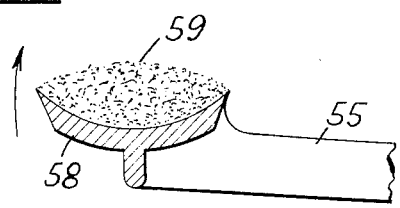
Fig. 11 is an enlarged fragmentary sectional view showing a detail in the construction of the blades of the movable member employed in the present invention.

It is thus seen that when the dasher blades 58 pass through the fluid suspension in the reservoir a certain amount of the stock adheres to the face of the blade as indicated by the broken lines at 59 in Fig. 11. This adhering stock provides a surface which frictionally engages with the free stock particles in the path of rotation in the reservoir. This adhering mass provides a frictional engaging surface that determines the frictional drag upon the dasher.

In operation, it is seen that the stock by reason of its feed to the bottom of the reservoir 10 moves upwardly over the dasher blades and is in more or less constant motion, but a portion continually adheres to the concave face of the blades as shown in Fig. 11, although this stock changes from time to time as the average density of the stock in the reservoir 10 changes. The friction of the stock at 59 against the particles in the free stock produces a frictional drag upon the beater blades as they are rotated in the reservoir. The beater, as a result, requires more torque to drive the same at the desired velocity, consequently the driving force imparted by the flexible member 24 to the pulley 23 is increased and the force transmitted from the motor 17 to the pulley 23 is also increased. When this force increases, the force differential or tension in the flexible cable 24 increases and the tension sheave 25 is made to rise and move the valve member 51 in an opening direction, as above described. This movement operates to admit the consistency modifying fluid to the reservoir 10 at a certain rate, which flow continues until the consistency again regains its normal conditions. When the normal condition returns the force differential or tension transmitted by the flexible cable 24 returns to normal, the tension sheave 25 falls in response thereto, and the valve member 51 is against moved to its normal position.

In order that the paper making machinery may be properly adjusted to meet the varying conditions in the stock consistency and also to accommodate the extraordinary operating conditions noted above, should such conditions continue for any material length of time, it is desirable to apprise the operator of these conditions by suitable indicating means, preferably visual indicating means automatically actuated by the regulating valve.

A modified form of the valve actuated mechanism adapted for this purpose is shown in Fig. 4. Here an electric switch is shown in broken lines at 60, secured to the side of the casing 28 and arranged to be actuated by the movement of the tension sheave 25. This switch device, is shown in full lines in Fig. 5, where 61 denotes a protective casing in which is pivotally mounted an evacuated insulating vessel 62 containing a plurality of contact electrodes 63, 63' and 63'', the circuits through which are adapted to be closed by a movable member, for example a globule of mercury; this globule being always in contact with a horizontal electrode 65 disposed to lie interiorly on the bottom of the vessel 62. The electrodes 63, 63', 63'' and 65 have flexible electrical conductors connecting the same to terminals 66, 67, 68 and 69, mounted respectively in an insulating manner in a wall of the chamber 61. This permits free movement of the vessel 62 without interfering with the electrical connections.

The pivotal support for the vessel 62 is provided with an arm 70 which has a journalled support at 71 that is rigidly connected with a second arm 72, shown in broken lines in Fig. 5 and in full lines in Fig. 4; this manner of illustration being adopted to indicate that the pivotal connection 71 passes through the wall of the casing 28 so that the arm 72 operates within the casing, whereas the switch mechanism is without the casing. The arm 72 is positively connected by means of the links 73—73' to the movable bracket 44. Thus, it is seen when the tension sheave rises with its bracket 44, the vessel 62 is tilted first to a horizontal position, so that the contact making globule 64 moves from the electrode 63 to engage with the electrode 63'. When this takes place, the circuit through the electrode 63 is broken and a second circuit established through the electrode 63'. These circuits are arranged to give the visual indication desired. Any convenient arrangement of circuits for this purpose may be employed, for example that shown in Fig. 6. Here 75 and 76 denote respectively main buses or feeders for supplying electric energy to the circuits from any convenient source, for example a lamp socket. The bus 75 is connected by way of conductor 77 to the terminal 66 supplying current to the electrode 65. When the circuit is closed, the globule is in contact with the electrode 63, the circuit being completed through the conductor 78 and a suitable visual indicator A, for example a colored lamp, and thence to the bus 76. In the horizontal position a conductor 79 establishes a circuit through a visual indicator B back to the bus 76.

There is also shown a fourth conductor 80 which completes a third circuit made from the electrode 63'' through another visual indicator C and thence to the bus 76. Where the visual indicators A, B and C are colored lights, the lamp at A would preferably be white, that at B yellow and that at C red. When the stock has normal consistency, it is seen that normal force differential obtains in the flexible cable 24 and the vessel 62 is tilted so as to complete the circuit through the electrode 63. The white light at A in consequence indicates that conditions are normal. When the consistency has increased, then the friction drag on the dasher blades of member 16 is increased and the force differential in the flexible cable 24 is increased, so that the upward movement of the tension sheave 25 occasioned thereby tilts the vessel 62 from its normal position into the horizontal position, so that the contact making globule moves against the electrode 63'. In consequence, the circuit through the lamp B is completed and a yellow signal is observed. This indicates to the operator that a consistency correction is taking place and that the machine should now be watched to note if an extraordinary abnormal condition arises. In such event, the tension in the flexible cable 24 is increased so that the valve member 51 is elevated to its maximum position, and the arm 72 is elevated so as to swing the vessel 62 into the position shown in Fig. 6 where the circuit through the electrode 63'' and conductor 80 will be completed and a red signal at C will be observed. This indicates to the operator that steps should be taken at once to remedy the extraordinary abnormal conditions which have arisen.

While the arrangement shown in Figs. 1 to 3 is adapted to translate the friction between stock particles into a force differential in the flexible cable in a manner which controls the flow of the consistency modifying fluid, still other means for obtaining a force differential or its equivalent from means other than a flexible cable, may be employed for the practice of the present invention. An arrangement operating on this principle employing differential gearing for this purpose is shown in Fig. 7. Here the movable member 16 is arranged to be driven by gear train 81—82 which in turn is driven by the shaft 83 that is connected to the gear 84 of a differential gear device. This device is mounted in a yoke 85 which is supported to turn in bearings 86—86' of a frame which carries the device. The driving shaft 87, driven by any suitable prime mover, is connected to a second gear 88 of the differential gearing which drives the gear 84 through the interposed gears 89 and 89' the latter being pivoted on the yoke 85. The yoke 85 has an arm 90 extending from one side which applies a pressure, proportional to the torque differential transmitted against a resilient member, and operates a plunger 91 connected to a valve to control the flow of consistency modifying fluid in substantially the same manner as does the valve 19 in Figs. 1 to 3.

Still another arrangement adapted for this purpose is shown in Figs. 8 and 9 which utilizes a planetary gear device having gears so related that their relative position indicates the force differential which is to be employed to control the flow of consistency modifying fluid. Here the movable member 16 is driven through a gear train 92—93 from the shaft 94 that is journaled in a casing 95 and secured to the gear member 96. This latter turns in a casing 97 and has internal teeth at 98 which engage with the planetary gears 99 and 99' carried by an arm 100 which is pivoted on a drive shaft 101. This latter is adapted to be driven by any suitable prime mover and has on the end extending into the casing 97 a gear 102 which engages with the planetary gears 99 and 99' whereby it transmits driving force to the gear 96. When the friction drag increases between the stock particles, the driving torque transmitted to the gear 96 is increased. This is represented by an angular lag or displacement of the gear 96 which causes the arm 100 to turn through a short arc, for example clockwise where the gears have the motions indicated by the arrows in Fig. 8, so that the outer end 103 of the arm will compress a resilient member 104 and operate the valve 105 through its stem 106 whereby it controls the flow of the consistency regulating fluid.

The means for regulating the consistency of fluid suspension above described is equally applicable to the regulation of the consistency of fluid bodies which flow through closed conduits under pressure, it being noted that the reservoir 10 while closed in about the top is substantially at atmospheric pressure.

An arrangement for applying the regulating means of the present invention to a closed conduit system containing a fluid suspension under pressure, is shown in Fig. 10. Here a closed chamber 110 is supplied with fluid material through a main conduit 111, the pressure in this conduit being maintained by any suitable pressure means, for example, a centrifugal pump shown at 112; this pump being adapted to pump from a reservoir as shown at 113. The fluid material passes from the chamber 110 out through a conduit 114.

Within the chamber 110, is disposed a rotating member 116 of the dasher type similar to the member 16 in the reservoir 10. This member 116 is adapted to be driven by a suitable prime mover, for example an electric motor as shown at 117, there being interposed mechanical couplings, indicated generally at 118, through which the driving force from the motor 117 is communicated to the rotating member 116.

The driving coupling here employed may be of substantially the same variety as that shown in Fig. 3, where a force differential corresponding to the friction drag on the member 116 is arranged to actuate a valve, such as shown at 119, for controlling the admission of consistency modifying fluid through a conduit such as shown at 120. This latter is arranged to communicate with the main conduit 111, preferably at a point of low pressure as shown.

In this arrangement, the rotating member is completely enveloped in the chamber 110 at all times by the fluid material therein containing solid particles in suspension and under pressure. It is thus seen that the friction drag on the member 116 when constructed as shown in Fig. 11, will be proportional to the friction between the solid particles, and is consequently directly proportional to the viscosity which is the index of the conditions which actuate the regulating device of the present invention.

By the present invention, it is seen that a compact unitary regulating device is provided which may be installed in connection with machinery where consistency is to be regulated, for example, upon paper making machinery. Such regulating devices are adapted to be installed in any convenient place and so arranged that they occupy relatively little space. It is also seen that the working parts of the device in the arrangement here shown are fully protected from outside influences, the device being internally constructed, so as to be strong and durable, and operates with relatively little friction. It is further seen that the moving cable 24 and the corresponding movable parts in the modified forms here proposed move to a position in dynamic equilibrium with the differential force which effects regulation. The fact that the moving parts are in dynamic equilibrium and not in a stationary or static state of equilibrium is of importance since the inertia of the movable part when responding to a change in viscosity, is relatively small, whereas the inertia to be over come in moving from a static state of equilibrium is relatively great. The regulating effect of the parts here employed when in dynamic equilibrium is consequently substantially instantaneous, thereby insuring a close and accurate regulation of the consistency at all times.

The operating controlling means here employed is seen to afford the direct control of the consistency of fluid suspensions, such as paper stock, and is not dependent upon the velocity with which the paper stock moves and consequently may be depended upon to give accurate and continuous operation directly responsive to the viscosity or consistency of the fluid suspension wherever employed.

When applied to paper mills, the present invention affords accurate, instantaneous and continuous regulation of the stock consistency. This results in exceedingly close regulation of the paper stock at all times and insures substantially a minimum variation in the paper caliper. It is well recognized that variations in the stock consistency affect the caliper and are reflected quickly and in large degree in the paper output. Even slight variations in the consistency are known to cause relatively great and rapid variations in the paper caliper.

It is also seen that the present invention avoids the use of all relaying devices which are not infrequently used to step-up weak indicating forces to a sufficient magnitude to give a regulating force. Since, by the present invention, the regulating force is derived directly from the driving force transmitted from the prime mover to the moving element in the fluid suspension, there is always available an indicating force differential of sufficient magnitude to operate directly the consistency controlling means.

Also, it is seen that this indicating force represents the average taken directly from substantially the whole of the fluid material in the stock reservoir and is consequently not controlled by a portion or so-called "sample" arbitrarily taken from a part of the stock and assumed to be an index of the condition of the whole. It is well recognized that such samples are not always reliable indices of the whole, and the present invention avoids the use of such sampling means.

While regulating devices according to the present invention have been referred to above as specifically applicable to the paper making art, it is obviously applicable to the control of consistency in other arts, for example the consistency of clay compounds, glues, and the like, and may also be applied to the control of viscosity where the application of heat is the viscosity modifying agent.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a device for regulating consistency of a fluid suspension, the combination comprising movable means adapted to be disposed in the suspension and arranged to have a frictional drag responsive to the consistency of said suspension, means for driving said movable means, a driving train arranged to effect driving connection between said driving means and said movable means having a part adapted to move in dynamic response to the driving force transmitted, and means for controlling the utilization of a consistency-modifying agent arranged to be actuated directly by the motion of said movable part.

2. In a device for regulating consistency of a fluid suspension, the combination comprising movable means adapted to be disposed in the suspension and arranged to have a frictional drag responsive to the consistency of said suspension, a motor for driving said movable means, a driving train arranged to effect driving connection between said motor and means, said driving train having a part adapted to move in dynamic response to the force differential transmitted by said train and serving as an index thereof, a valve controlling the flow of a consistency-modifying agent, and means for connecting said valve to be actuated by the motion of said index part.

3. In a device for regulating consistency of a fluid suspension, the combination comprising movable means adapted to be disposed in said suspension and arranged to have a frictional drag responsive to the consistency of said suspension, a motor for driving said movable means, a driving train including a pair of pulleys arranged to effect driving connection between said motor and means, a cable arranged to effect driving connection between said pulleys, means moving in response to the driving tension in said cable, a valve for controlling the passage of a consistency-modifying agent, and actuating connections between aid valve and said tension responsive means.

4. In a device for regulating consistency of a fluid suspension, the combination comprising movable means adapted to be disposed in said suspension and arranged to have a frictional drag responsive to the consistency of said suspension, a motor for driving said movable means, a driving train including a pair of pulleys arranged to effect driving connection between said motor and means, a cable connecting said pulleys in driving relation, a tension sheave yieldably held in riding engagement on said cable, a valve for controlling the passage of a consistency-modifying agent, and actuating connections between said sheave and said valve.

5. In a device for regulating consistency of a fluid suspension, the combination comprising movable means adapted to be disposed in said suspension and arranged to have a frictional drag responsive to the consistency of said suspension, a motor for driving said movable means, a driving train including a pair of pulleys arranged to effect driving connection between said motor and means, a casing adapted to substantially enclose said driving train including a support for said motor, a cable within said casing adapted to connect said pulleys in driving relation, a tension sheave adapted to ride on said cable, a bracket for said sheave adapted to reciprocate in said casing and to hold said sheave in yieldable riding engagement with said cable, a valve arranged to control the flow of the consistency-modifying fluid, and actuating connections interposed between said bracket and said valve.

6. In a device for regulating consistency of a fluid suspension, the combination comprising movable means adapted to be disposed in said suspension and arranged to have a frictional drag responsive to the consistency of said suspension, a motor for driving said movable means, a driving train including a pair of pulleys arranged to effect driving connection between said motor and means, a casing adapted to enclose substantially said driving train having a part adapted to support said motor, a cable within said casing for connecting said pulleys in driving relation, a tension sheave adapted to ride on said cable, a bracket adapted to reciprocate in said casing and to support said tension sheave in riding engagement with said cable, a resilient member interposed between said bracket and said casing, a valve mounted on the exterior of said casing adapted to control the flow of a consistency-modifying fluid, and actuating connections extending from said bracket through said casing to said valve.

7. In a device for regulating the consistency of a fluid suspension, the combination comprising a chamber for the suspension, a rotatable member adapted to be submerged in the suspension in said chamber, means for driving said rotatable member, a driving train interposed between said driving means and rotatable member, means dynamic responsive to the force differential in said driving train, and means actuated by said force-differential responsive means for controlling the modification of the consistency of said suspension.

8. In a device for regulating the consistency of a fluid suspension, the combination comprising a reservoir adapted to yield a supply of said suspension under pressure, a rotatable member submerged in said suspension in said reservoir, means for driving said rotatable member, a driving train interposed between said driving means and rotatable member, means dynamic responsive to the force differential in said driving train, and means actuated by said force-differential responsive means for controlling the position of a consistency modifying valve member.

9. In a device for regulating the consistency of paper stock, the combination comprising a stuff-box adapted to supply paper stock at a substantially constant head, a rotatable member adapted to be submerged in the paper stock in said stuff-box and to carry a portion thereof in frictional engagement with the free stock therein, means for driving said rotatable member, a driving train interposed between said driving means and said rotatable member, means dynamic responsive to the force differential in said driving train, and means actuated by said force-differential responsive means for controlling the flow of a consistency-modifying fluid.

10. In a device for regulating the consistency of paper stock, the combination comprising a stuff-box adapted to contain a supply of paper stock at a substantially constant head, a rotatable member adapted to be submerged in the paper stock in said stuff-box, said rotatable member having concave blades adapted to carry an adhering portion of paper stock when rotated in said stuff-box, whereby to produce a frictional drag upon the same, means for driving said rotatable member, a driving train interposed between said driving means and rotatable member, means in said driving train responsive to said frictional drag, and means actuated by said drag-responsive means for controlling the flow of additions of consistency-modifying water.

11. In a device for regulating the consistency of paper stock, the combination comprising a stuff-box adapted to contain a supply of paper stock at a substantially constant head, a rotatable member adapted to be submerged in the paper stock in said stuff-box, said rotatable member having concave blades adapted to carry an adhering portion of paper stock when rotated in said stuff-box, whereby to produce a frictional drag upon the same, a motor for driving said movable means, a driving train arranged to effect driving connection between said motor and means, said driving train having a part adapted to move in response to the force differential transmitted by said train and serving as an index thereof, a valve controlling the flow of a consistency-modifying agent, and means for connecting said valve to be actuated by the motion of said index part.

12. In a device for regulating the consistency of paper stock, the combination comprising a stuff-box adapted to contain a supply of paper stock at a substantially constant head, a rotatable member adapted to be submerged in the paper stock in said stuff-box, said rotatable member having concave blades adapted to carry an adhering portion of paper stock when rotated in said stuff-box, whereby to produce a frictional drag upon the same, a motor for driving said movable means, a driving train including a pair of pulleys arranged to effect driving connection between said motor and means, a cable connecting said pulleys in driving relation, a tension sheave yieldably held in riding engagement on said cable, a valve for controlling the flow of a consistency-modifying fluid, and actuating connections between said sheave and said valve.

13. In a device for regulating the consistency of paper stock, the combination comprising a stuff-box adapted to contain a supply of paper stock at a substantially constant head, a rotatable member adapted to be submerged in the paper stock in said stuff box, said rotatable member having concave blades adapted to carry an adhering portion of paper stock when rotated in said stuff-box, whereby to produce a frictional drag upon the same, a motor for driving said movable means, a driving train including a pair of pulleys arranged to effect driving connection between said motor and means, a casing adapted to enclose substantially said driving train having a part adapted to support said motor, a cable within said casing for connecting said pulleys in driving relation, a tension sheave adapted to ride on said cable, a bracket adapted to reciprocate in said casing and to support said tension sheave in riding engagement with said cable, a resilient member interposed between said bracket and said casing, a valve mounted on the exterior of said casing adapted to control the flow of a consistency-modifying fluid, and actuating connections extending from said bracket through said casing to said valve.

14. In a device for regulating the consistency of a fluid suspension, the combination comprising a chamber through which substantially the whole of the utilized suspension passes, and a rotatable member disposed in said chamber and submerged in the suspension therein, said member having a plurality of trough-like blades disposed substantially parallel to the axis of rotation and facing in the direction of motion.

15. In a device for regulating the consistency of a fluid suspension, the combination comprising a chamber through which substantially the whole of utilized suspension passes, and a rotatable member disposed in said chamber and submerged in the suspension therein, said member having a plurality of trough-like blades disposed substantially parallel to the axis of rotation and facing in the direction of motion, whereby the driving effort for rotating said member is proportional to the frictional drag between particles picked up by said blades and particles in the free stock about said member.

16. In a device for regulating the consistency of a fluid suspension, the combination comprising a chamber through which substantially the whole of utilized suspension passes, and a rotatable member disposed in said chamber and submerged in the suspension therein, said member having a plurality of arms and concave blades disposed therebetween, said blades being arranged to face toward the direction of motion whereby the driving effort for rotating said member is proportional to the frictional drag between particles picked up by said blades and particles in the free stock about said member.

17. In a device for regulating the consistency of a fluid suspension, the combination comprising movable viscosity-responsive means, driving means for constantly moving said viscosity-responsive means, and coupling means interposed between said driving means and said viscosity-responsive means having a dynamically responsive movable part for indicating the driving effort transmitted by said coupling, said means being operatively related to form a unitary mechanism.

18. In a device for regulating the consistency of a fluid suspension, the combination comprising movable viscosity-responsive means, driving means for constantly moving said viscosity-responsive means, coupling means interposed between said driving means and said viscosity-responsive means having a dynamically responsive movable part for indicating the driving effort transmitted by said coupling, and means for controlling a consistency-modifying agent connected to be actuated by said indicating part.

19. In a device for regulating the consistency of a fluid suspension, the combination comprising movable viscosity-responsive means, driving means for constantly moving said viscosity-responsive means, coupling means interposed between said driving means and said viscosity-responsive means having a dynamically responsive movable part for indicating the driving effort transmitted by said coupling, and visual indicating means having signalling devices showing normal and abnormal conditions connected to be actuated by said indicating part.

20. In a device for regulating the consistency of a fluid suspension, the combination comprising movable viscosity-responsive means, driving means for constantly moving said viscosity-responsive means, coupling means interposed between said driving means and said viscosity-responsive means having a dynamically responsive movable part for indicating the driving effort transmitted by said coupling, means for controlling a consistency-modifying agent, and visual indicating means having signalling devices showing normal and abnormal conditions; said controlling means and said indicating means being jointly connected to be actuated by said indicating part.

In testimony whereof I affix my signature.

SIDNEY E. MEYERS.